United States Patent
Welton et al.

(10) Patent No.: US 8,268,758 B2
(45) Date of Patent: Sep. 18, 2012

(54) CONSOLIDATING EMULSIONS COMPRISING CONVERTIBLE SURFACTANT COMPOSITIONS AND METHODS RELATED THERETO

(75) Inventors: Thomas Welton, Duncan, OK (US); Rajesh Saini, Duncan, OK (US); Narongsak Tonmukayakul, Duncan, OK (US); Jason Bryant, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 335 days.

(21) Appl. No.: 12/760,077

(22) Filed: Apr. 14, 2010

(65) Prior Publication Data

US 2011/0257051 A1 Oct. 20, 2011

(51) Int. Cl.
*C09K 8/56* (2006.01)

(52) U.S. Cl. ........ 507/239; 507/219; 166/285; 166/292; 166/293; 166/294; 166/295

(58) Field of Classification Search .................. 507/219, 507/239; 166/285, 292–295
See application file for complete search history.

(56) References Cited

U.S. PATENT DOCUMENTS

| 4,670,501 | A | 6/1987 | Dymond et al. |
| 5,249,627 | A | 10/1993 | Harms et al. |
| 5,833,000 | A | 11/1998 | Weaver et al. |
| 5,839,510 | A | 11/1998 | Weaver et al. |
| 5,853,048 | A | 12/1998 | Weaver et al. |
| 6,439,309 | B1 | 8/2002 | Matherly et al. |
| 7,131,491 | B2 | 11/2006 | Blauch et al. |
| 2005/0277554 | A1 | 12/2005 | Blauch et al. |

*Primary Examiner* — Alicia Toscano
(74) *Attorney, Agent, or Firm* — Robert A. Kent; McDermott, Will & Emery LLP

(57) ABSTRACT

Methods are provided that include a method comprising: providing an emulsified treatment fluid comprising an oleaginous phase, an aqueous phase, a consolidating agent, and an emulsifying agent that comprises at least one convertible surfactant described by a one of the disclosed formulae, and placing the subterranean treatment fluid in a subterranean formation.

23 Claims, No Drawings

CONSOLIDATING EMULSIONS COMPRISING CONVERTIBLE SURFACTANT COMPOSITIONS AND METHODS RELATED THERETO

BACKGROUND

The present invention relates to the treatment of subterranean formations. More particularly, the present invention relates to consolidating agent emulsions that comprise convertible surfactant compositions, and their use in subterranean applications.

Hydrocarbon wells are often located in subterranean formations that contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formations," "unconsolidated portions of a subterranean formation," and derivatives thereof are defined herein to include any formations that contain unconsolidated particulates, as that term is defined herein. "Unconsolidated subterranean formations," and "unconsolidated portions of a subterranean formation," as those terms are used herein, include subterranean fractures wherein unconsolidated particulates reside within the open space of the fracture (e.g., forming a proppant pack within the fracture).

One method of controlling particulates in such unconsolidated formations has been to produce fluids from the formations at low flow rates, so that the near well stability of sand bridges and the like may be substantially preserved. The collapse of such sand bridges, however, may nevertheless occur, possibly due to unintentionally high production rates and/or pressure cycling as may occur from repeated shut-ins and start ups of a well. The frequency of pressure cycling is critical to the longevity of the near well formation, especially during the depletion stage of the well when the pore pressure of the formation has already been significantly reduced.

One method used to control particulates in unconsolidated formations involves consolidating unconsolidated particulates into stable, permeable masses by applying a consolidating agent (e.g., a resin or tackifying agent) to the subterranean formation. Consolidating agents may be referred to in the art as aggregating or aggregation agents. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging pore channels, halting pumping when the well bore is plugged with solid material, or resulting in a downhole explosion as a result of the heat of polymerization. Uniform placement of curable resin into the formations having long intervals is most desirable. However, formations often comprise a wide range of permeabilities even within a single reservoir located along a well bore. As a result, using these conventional processes to treat long intervals (e.g., over about 20 feet) of unconsolidated regions has often heretofore resulted in non-uniform, limited, and/or inadequate penetration distances of consolidating agents into formations.

Oftentimes to protect the consolidating agent from prematurely reacting in the well bore, the consolidating agent may be placed in the well bore via an emulsion. However, the stability of such emulsions can be problematic. For example, some current water-based emulsion systems do not provide strong enough emulsions to carry the consolidating agent downhole. The result is a premature setting of the consolidating agent in an undesirable location in the well bore. This then presents removal issues. Additionally, the consolidating agent is not used for its intended purpose. Additionally, the surfactants that are often used in such emulsions can present clean-up and residue problems. For instance, certain surfactants used heretofore may have undesirable environmental characteristics and/or may be limited by strict environmental regulations in certain areas of the world. As a result, use of these surfactants in subterranean treatments may result in the potential for the bioaccumulation and/or persistence of such surfactants in the environment, which may create potential dangers for their use, such as adverse effects on shrimp and other aqueous aquatic species.

SUMMARY

The present invention relates to the treatment of subterranean formations. More particularly, the present invention relates to consolidating agent emulsions that comprise convertible surfactant compositions, and their use in subterranean applications.

In some embodiments, the present invention provides methods that include a method comprising: providing an emulsified treatment fluid comprising an oleaginous phase, an aqueous phase, a consolidating agent, and an emulsifying agent that comprises at least one convertible surfactant described by a formula selected from the group consisting of

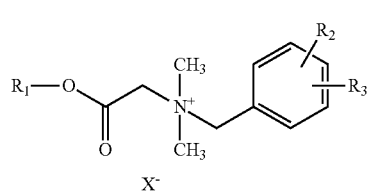

Formula 1 wherein $R_1$, $R_2$ and $R_3$ are independently H, alkyl, aryl, polyether, or oxyalkylate group and X may be any halogen counterion, a sulfate ion, a tosylate ion, a mesylate ion, or the like;

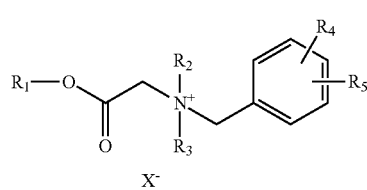

Formula 2 wherein $R_1$ is a linear or nonlinear alkyl group of 6-22 carbon chains, aryl group, and alkyl aryl group; $R_2$ and $R_3$ are independently selectable from an alkyl group of 1-6 carbon chains, $R_4$ and $R_5$ are independently H, alkyl, aryl, polyether, or alkyloxyalkylate group and X may be any halogen counterion, a sulfate ion, a tosylate ion, a mesylate ion, or the like; and

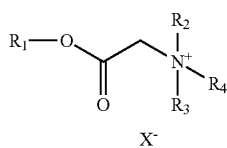

Formula 3 wherein $R_1$, $R_2$, $R_3$, and $R_4$ are not hydrogen, and wherein $R_1$, $R_2$, $R_3$, and $R_4$ are carbons atoms linked to any other suitable group and X may be any halogen counterion, a sulfate ion, a tosylate ion, a mesylate ion, or the like; and placing the subterranean treatment fluid in a subterranean formation.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to the treatment of subterranean formations. More particularly, the present invention relates to consolidating agent emulsions that comprise convertible surfactant compositions, and their use in subterranean applications.

Of the many advantages of the convertible surfactants useful in the present invention, only some of which are discussed or eluded to herein, one advantage is that the convertible surfactants can be used in emulsion systems to place a resin downhole to control, e.g., for fines control, formation consolidation, proppant consolidation, and gravel pack consolidation. These surfactants present the ability to form strong emulsions of these resins, which enables placement of the resins in a desired location downhole. In other words, the emulsions remain stable during and until resin placement. At that point, the surfactant converts, and the emulsion is broken, resulting in placement of the resin in the desired location of the well bore or subterranean formation. The convertible surfactants useful in the present invention convert from a quarternary surfactant to an amphoteric surfactant or zwitterionic surfactant. This conversion may occur under a variety of conditions through a variety of chemical reactions, e.g., hydrolysis and de-esterification. In converting, the properties of the surfactant are altered, which may be advantageous to achieve desired results. Additionally, it is believed that the surfactant does not change the wettability of the formation, which is desirable. Therefore, at least in some respects, the convertible surfactants useful in the present invention present a better means of facilitating the use of resins in downhole applications without the disadvantages often associated with other non-convertible surfactants. Moreover, the surfactants, at least in some embodiments, may have biocidal qualities that may present additional benefits.

As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

The terms "conversion" and/or "convertible" refer to the conversion of an ester group of an ester containing quaternary surfactant into an alcohol and a amphoteric or zwitterionic surfactant. This conversion may be the result, inter alia, of a chemical reaction, a thermal reaction, an enzymatic reaction, a reaction induced by radiation, or a combination of these. The convertibility of the convertible surfactants used in the present invention depends, in part, on the presence of the ester linkage and the quaternary amine. The rates at which such surfactants convert are dependent on temperature, pH, kinetics of hydrolysis of ester group, composition, sequence, length, molecular geometry, hydrophilicity, hydrophobicity, and additives. Also, the environment to which the convertible surfactant is subjected may affect how it converts, e.g., temperature, presence of moisture, oxygen, microorganisms, enzymes, pH, and the like.

The emulsified treatment fluids of the present invention comprise a discontinuous phase, a continuous phase, a consolidating agent, and a convertible surfactant as described herein. As used herein, the term "emulsion," refers to an opaque dispersion of one liquid (the "discontinuous phase") in a second, immiscible liquid (the "continuous phase"). Oftentimes, the discontinuous phase may comprise an oleaginous fluid and the continuous phase may comprise an aqueous fluid, or vice versa. An emulsion is stabilized by a surfactant film ("emulsifying agent") at the interface between the two liquids that produces electrical or steric barriers to coalescence of the droplets of the dispersed liquid phase. As in emulsions, the dispersion of particles of a solid in a liquid in which it is insoluble is stabilized by a surfactant film ("dispersing agent") at the interface between the two phases that produces electrical or steric barriers to the aggregation of the dispersed solids. The term "emulsion" as used herein encompasses both emulsions as well as dispersions. As referred to herein, the phrase "emulsified treatment fluid" refers to any subterranean treatment fluid that has a continuous phase and a discontinuous phase.

The convertible surfactants useful in the present invention have an ester linkage and a quaternary amine group. The surfactants convert over time. Because the convertible surfactants have built into their structure a functional group with limited stability, i.e., the ester linkage, removal of this functional group should at least partially decrease the surface activity of the surfactants. In some embodiments, the convertible surfactants may cleave at the juncture of the head group and the tail of the surfactant for a particular surfactant molecule, which may result in the instantaneous disappearance of the surface activity for that surfactant molecule; they cannot be reused in their original form. They may still have surface activity.

In some embodiments, the present invention provides methods that include a method comprising: providing an emulsified treatment fluid comprising an oleaginous phase, an aqueous phase, a consolidating agent, and an emulsifying agent that comprises at least one convertible surfactant described by a formula selected from the group consisting of Formula 1, Formula 2 or Formula 3 as set forth below:

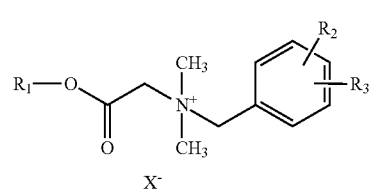

Formula 1 wherein $R_1$, $R_2$ and $R_3$ are independently H, alkyl, aryl, polyether, or oxyalkylate group and X may be any halogen counterion, a sulfate ion, a tosylate ion, a mesylate ion, or the like;

Formula 2

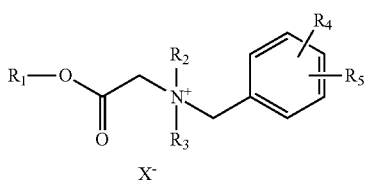

wherein $R_1$ is an linear or nonlinear alkyl group of 6-22 carbon chains, aryl group, and alkyl aryl group; $R_2$ and $R_3$ are independently selectable from an alkyl group of 1-6 carbon chains, $R_4$ and $R_5$ are independently H, alkyl, aryl, polyether, or alkyloxyalkylate group and X may be any halogen counterion, a sulfate ion, a tosylate ion, a mesylate ion, or the like; and Formula 3

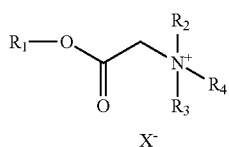

wherein $R_1$, $R_2$, $R_3$, and $R_4$ are not hydrogen, and wherein $R_1$, $R_2$, $R_3$, and $R_4$ are carbon atoms linked to any other suitable group and X may be any halogen counterion, a sulfate ion, a tosylate ion, a mesylate ion, or the like; and placing the subterranean treatment fluid in a subterranean formation.

When used in an emulsion context, whether an oil-in-water ("O/W") or water-in-oil ("W/O") emulsion is formed, may be determined by the relative hydrophobicity of the tail and the hydrophilicity of the head group. If the tail or hydrophobicity of the molecule is higher it will form water-in-oil emulsion. If the hydrophilicity of the molecule is greater than hydrophobicity, it might form oil-in-water emulsion. The hydrophile-lipophile balance ("HLB') of the surfactant may provide a quantitative prediction of whether the surfactant will facilitate the formation of an O/W or a W/O emulsion, or whether it will behave as a foamer, defoamer, gelling agent, wetting agent, emulsifier or deemulsifier. A person skilled in the art can design appropriate HLB to make surfactant work as O/W or W/O emulsifier. HLB is a well known system that can be determined from the chemical formula of the surfactant using empirically determined group numbers. For the convertible surfactants utilized in the present invention, the HLB may be controlled by controlling the length of the polymeric chain during the polymerization reaction. Even the HLB system is only semi-empirical, and other factors (such as the relative phase volume of oil and water) may have a considerable influence on the type of emulsion formed. At different HLB, the surfactant can behave as a foamer, defoamer, emulsifier, deemulsifier, gelling etc.

By varying the above-listed factors, the specific properties of the convertible surfactants such as solubility, wettability, emulsifying, foaming, antifoaming, cloud point, gelling, solubilizing agent, and the like may be varied. For example, where used as an emulsifying agent, a convertible surfactant having an HLB of from about 3 to about 6 may be suitable to stabilize a W/O emulsion. In other embodiments, where used as an emulsifying agent, a convertible surfactant having an HLB from about 8 to about 18 may be suitable to stabilize an O/W. Those of ordinary skill in the art, with the benefit of this disclosure, will be able to determine the appropriate convertible surfactants to use for a particular application.

The convertible surfactant is added in a range of about 0.1% to 20% by weight of the emulsified treatment fluid. If desired, the surfactant may be added in a range of about 0.1% to 5% by weight of the emulsified treatment fluid. One of ordinary skill in the art, with the benefit of this disclosure, will be able to determine the appropriate amount of the convertible surfactant to include in the treatments fluids for a particular application.

For the emulsifying embodiments, the continuous phase may comprise an aqueous fluid or an oleaginous fluid, depending on whether the fluid is an O/W emulsion or a W/O emulsion.

Suitable aqueous fluids may include, but are not limited to, freshwater, seawater, saltwater (e.g., saturated or unsaturated), and brines (e.g., saturated saltwater). Any combination of these may be suitable as well. The aqueous fluid may be from any source, provided that it does not adversely affect the stability of the emulsified treatment fluids of the present invention. Glycols and polyols may be suitable as well.

Suitable oleaginous fluids may include any oleaginous fluid that can be used in subterranean applications. This choice may be impacted by applicable environmental standards. The oleaginous fluid may be from natural or synthetic sources. Examples of suitable oleaginous fluids include α-olefins, internal olefins, alkanes, aromatic solvents, cycloalkanes, liquefied petroleum gas, kerosene, diesel oils, crude oils, gas oils, fuel oils, paraffin oils, mineral oils, low toxicity mineral oils, olefins, esters, amides, synthetic oils such as polyolefins, polydiorganosiloxanes, siloxanes, organosiloxanes, ethers, acetals, dialkylcarbonates, hydrocarbons, other petroleum distillates, certain mixtures of crude oil, and any combination thereof. Examples of suitable oleaginous fluids include those commercially available from Halliburton Energy Services, Inc., in Duncan, Okla., under the tradenames "ACCOLADE™ BASE," "PETROFREE®," "PETROFREE® LV," and "PETROFREE® S.F." Factors that determine the type of oleaginous fluid that may be used in a particular application include, but are not limited to, cost and performance characteristics of the particular oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin may be preferred. In the Gulf of Mexico, applications may prefer to utilize "ACCOLADE™ BASE" or a low toxicity mineral oil. One skilled in the art with the benefit of this disclosure will be able to choose a suitable oleaginous fluid for a particular application in view of such considerations. In certain exemplary embodiments of the present invention, the oleaginous fluid may be a crude oil. An example of a suitable liquid hydrocarbon is commercially available from Trysol Corporation of Sundre, Alberta, Canada, under the tradename "FRACSOL™." In certain embodiments, the oleaginous fluid chosen may be the same oleaginous fluid that may be used in a drilling fluid for a given well.

The discontinuous phase may comprise a consolidating agent. Suitable consolidating agents for the methods at the present invention include any composition that may stabilize a portion of the subterranean formation, which may, at least in part, stabilize unconsolidated particulates such that they are prevented from shifting or migrating. Examples of suitable consolidating agents include resins, tackifying agents, and gelable liquid compositions. Others may be suitable as well, as recognized by those skilled in the art with the benefit of this disclosure. The discontinuous phase may also comprise catalysts, solvents, activators, and any combination thereof. These may be in the continuous phase, if desired. It may depend on the interactions, and the desired delay of the set of the consolidating agent.

Resins suitable for use as the consolidating agents in the methods of the present invention include any suitable resin that is capable of forming a hardened, consolidated mass. The term "resin" as used herein includes any of numerous physically similar polymerized synthetics or chemically modified natural resins, including, but not limited to, thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and any combination thereof. Some suitable resins, such as epoxy resins, may be cured with an internal catalyst or activator so that when pumped downhole, they may be cured using only time and temperature. Other suitable resins, such as furan resins, may be formulated to cure at a delayed rate, or require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. Such external catalysts may be introduced into the subterranean formation by any suitable means. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a multi-functional, high performance epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and any combination thereof. Other preferred solvents include aqueous dissolvable solvents such as, methanol, isopropanol, butanol, glycol ether solvents, and any combination thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, isomers thereof, and any combination thereof. Selection of an appropriate solvent is dependent on the resin chosen and is within the ability of one skilled in the art with the benefit of this disclosure.

Examples of suitable resins are available from Hexion Specialty Chemicals in Columbus, Ohio.

Tackifying agents suitable for use in the methods of the present invention exhibit a sticky character and, thus, impart a degree of consolidation to unconsolidated particulates in the subterranean formation. The term "tackifying agent" is defined herein to include any composition having a nature such that it is (or may be activated to become) somewhat sticky to the touch. In certain embodiments, the tackifying agent may be formulated such that it is "activated" at a delayed rate, by contact with a catalyst or activator, or at certain conditions (e.g., temperature). Examples of suitable tackifying agents suitable for use in the present invention include non-aqueous tackifying agents, aqueous tackifying agents, and silyl-modified polyamides. Any combination of these may be suitable as well.

One type of tackifying agent suitable for use in the present invention is a non-aqueous tackifying agent. An example of a suitable tackifying agent may comprise polyamides that are liquids or in solution at the temperature of the subterranean formation such that they are, by themselves, non-hardening when introduced into the subterranean formation. One example of such a tackifying agent comprises a condensation reaction product comprised of commercially available polyacids and a polyamine. Suitable commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the relevant disclosures of which are herein incorporated by reference.

Non-aqueous tackifying agents suitable for use in the present invention may be either used such that they form non-hardening coating, or they may be combined with a multifunctional material capable of reacting with the non-aqueous tackifying agent to form a hardened coating. A "hardened coating," as used herein, means that the reaction of the tackifying agent with the multifunctional material will result in a substantially non-flowable reaction product that exhibits a higher compressive strength in a consolidated agglomerate than the tackifying agent alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and any combination thereof. In some embodiments of the present invention, the multifunctional material may be mixed with the tackifying agent in an amount of from about 0.01% to about 50% by weight of the tackifying agent to effect formation of the reaction product. In some preferable embodiments, the multifunctional material is present in an amount of from about 0.5% to about 1% percent by weight of the tackifying compound. Suitable multifunctional materials are described in U.S. Pat. No. 5,839,510, which is herein incorporated by reference.

Solvents suitable for use with non-aqueous tackifying agents include any solvent that is compatible with the non-aqueous tackifying agent and achieves the desired viscosity effect. The solvents that can be used in the present invention preferably include but are not limited to, dipropylene glycol methyl ether, butyl alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and any combination thereof. It is within the ability of one skilled in the art, with the benefit of this disclosure, to determine whether a solvent is needed to achieve a viscosity suitable to the subterranean conditions and, if so, how much. Depending on the solubility of the solvent they can be in oil or aqueous phase in emulsion, depending on the partition coefficient of the solvent between internal and external phase. One skilled in the art will recognize whether the partitioning coefficient will determine in which phase the solvent will be in the emulsion.

Aqueous tackifying agents suitable for use in the present invention are not significantly tacky when placed onto a particulate, but are capable of being "activated" (e.g., destabilized, coalesced, and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator and/or catalyst) and, when placed on a particulate, will increase the continuous critical resuspension velocity of the particulate when contacted by a stream of water. The aqueous tackifying agent may enhance the grain-to-grain contact between the individual particulates within the formation (e.g., proppant particulates, formation fines, or other particulates), helping bring about the consolidation of the particulates into a cohesive, flexible, and permeable mass. When used, the activator and/or catalyst may be a component of a treatment fluid comprising the aqueous tackifying agent, or may be introduced into the subterranean formation separately by any suitable means.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and any combination thereof. The teen "derivative" is defined herein to include any compound that is made from one of the listed compounds, for example, by replacing one atom in one of the listed compounds with another atom or group of atoms, ionizing one of the listed compounds, or creating a salt of one of the listed compounds. Methods of determining suitable aqueous tackifying agents and additional disclosure on aqueous tackifying agents can be found in U.S. Patent Application Publication 2005/0277554 A1, published Dec. 15, 2005, and U.S. Patent Application Publication 2005/0274517 A1 (now U.S. Pat. No. 7,131,491), published Dec. 15, 2005, which are hereby incorporated by reference.

Silyl-modified polyamide compounds suitable for use in the tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, which is herein incorporated by reference.

Some suitable tackifying agents are described in U.S. Pat. No. 5,249,627 by Harms, et al., which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% C 1-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl (meth)acrylates and their quaternary addition and acid salts, acrylamide, N-(dialkyl amino alkyl)acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and any combination thereof. These copolymers can be made by any suitable emulsion polymerization technique. Methods of producing these copolymers are disclosed, for example, in U.S. Pat. No. 4,670,501, which is incorporated herein by reference.

Gelable liquid compositions suitable for use in the methods of the present invention may comprise any gelable liquid composition capable of converting into a gelled substance capable of substantially plugging the permeability of the formation while allowing the formation to remain flexible. That is, the gelled substance should negatively impact the ability of the formation to produce desirable fluids such as hydrocarbons. As discussed above, the permeability of the formation may be restored by fracturing through the consolidated portion. As referred to herein, the term "flexible" refers to a state wherein the treated formation or material is relatively malleable and elastic and able to withstand substantial pressure cycling without substantial breakdown. Thus, the resultant gelled substance should be a semi-solid, immovable, gel-like substance, which, among other things, stabilizes the treated portion of the formation while allowing the formation to absorb the stresses created during pressure cycling. As a result, the gelled substance may aid in preventing breakdown of the formation both by stabilizing and by adding flexibility to the formation sands. Examples of suitable gelable liquid compositions include, but are not limited to, resin compositions that cure to form flexible gels, gelable aqueous silicate compositions, crosslinkable aqueous polymer compositions, and polymerizable organic monomer compositions.

Certain embodiments of the gelable liquid compositions comprise curable resin compositions. Curable resin compositions are well-known to those skilled in the art and have been used to consolidate portions of unconsolidated formations and to consolidate proppant materials into hard, permeable masses. While the curable resin compositions used in accordance with the present invention may be similar to those previously used to consolidate sand and proppant into hard, permeable masses, they are distinct in that resins suitable for use with the present invention do not cure into hard, permeable masses; rather they cure into flexible, gelled substances. That is, suitable curable resin compositions form resilient gelled substances between the particulates of the treated portion of the unconsolidated formation and thus allow that portion of the formation to remain flexible and to resist breakdown. It is not necessary or desirable for the cured resin composition to solidify and harden to provide high consolidation strength to the treated portion of the formation. On the contrary, upon being cured, the curable resin compositions useful in accordance with this invention form semi-solid, immovable, gelled substances.

Generally, the curable resin compositions useful in accordance with the present invention may comprise a curable resin, a diluent, and a resin curing agent. These will typically be in the discontinuous phase of an emulsified treatment fluid. When certain resin curing agents, such as polyamides, are used in the curable resin compositions, the compositions form the semi-solid, immovable, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of curable resins that can be used in the curable resin compositions of the present invention include, but are not limited to, organic resins such as polyepoxide resins (e.g., bisphenol A-epichlorihydrin resins), polyester resins, urea-aldehyde resins, furan resins, urethane resins, and any combination thereof. In certain embodiments, the polyepoxide resins are preferred.

Any diluent that is compatible with the curable resin and achieves the desired viscosity effect is suitable for use in the present invention. Examples of diluents that may be used in the curable resin compositions of the present invention include, but are not limited to, phenols, formaldehydes, furfuryl alcohols, furfurals, alcohols, ethers (e.g., butyl glycidyl ether and cresyl glycidyl etherphenyl glycidyl ether), and any combination thereof. In some embodiments of the present invention, the diluent comprises butyl lactate. The diluent may be used to reduce the viscosity of the curable resin composition to from about 3 to about 3,000 centipoises ("cP") at 80° F. Among other things, the diluent acts to provide flexibility to the cured composition. The diluent may be included in the curable resin composition in an amount sufficient to provide the desired viscosity effect. Generally, the diluent used is included in the curable resin composition in amount in the range of from about 5% to about 75% by weight of the curable resin.

Generally, any resin curing agent that may be used to cure an organic resin is suitable for use in the present invention. When the resin curing agent chosen is an amide or a polyamide, generally no flexibilizer additive will be required because, inter alia, such curing agents cause the curable resin composition to convert into a semi-solid, immovable, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the curable resin composition, whether a flexibilizer additive is included or not, in an amount in the range of from about 5% to about 75% by weight of the curable resin. In some embodiments of the present invention, the resin curing agent used is included in the curable resin composition in an amount in the range of from about 20% to about 75% by weight of the curable resin.

As noted above, flexibilizer additives may be used, inter alia, to provide flexibility to the gelled substances formed from the curable resin compositions. The term "flexibilizer additive" is defined herein to include any substance that is capable of imparting properties of flexibility (e.g., malleability, elasticity) to the substances formed from the curable resin compositions. Flexibilizer additives should be used where the resin curing agent chosen would cause the organic resin composition to cure into a hard and brittle material instead of desired gelled substances described herein. For example, flexibilizer additives may be used where the resin curing agent chosen is not an amide or polyamide. Examples of suitable flexibilizer additives include, but are not limited to, an organic ester, an oxygenated organic solvent, an aromatic solvent, and any combination thereof. In certain embodiments, ethers, such as dibutyl phthalate, are preferred. Where used, the flexibilizer additive may be included in the curable resin composition in an amount in the range of from about 5% to about 80% by weight of the curable resin. In some embodiments of the present invention, the flexibilizer additive may be included in the curable resin composition in an amount in the range of from about 20% to about 45% by weight of the curable resin.

In other embodiments, the gelable liquid compositions may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprises an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3:2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, immovable, gelled substance described above. Selection of a temperature-activated catalyst may be related, at least in part, to the temperature of the subterranean formation to which the gelable aqueous silicate composition will be introduced. The temperature-activated catalysts which can be used in the gelable aqueous silicate compositions of the present invention include, but are not limited to, ammonium sulfate, which is most suitable in the range of from about 60° F. to about 240° F.; sodium acid pyrophosphate, which is most suitable in the range of from about 60° F. to about 240° F.; citric acid, which is most suitable in the range of from about 60° F. to about 120° F.; and ethyl acetate, which is most suitable in the range of from about 60° F. to about 120° F. Generally, the temperature-activated catalyst is present in the range of from about 0.1% to about 5% by weight of the gelable aqueous silicate composition. When used, the temperature-activated catalyst may be a component of a treatment fluid comprising the gelable aqueous silicate composition, or may be introduced into the subterranean formation separately by any suitable means.

In other embodiments, the gelable liquid compositions may comprise crosslinkable aqueous polymer compositions. Generally, suitable crosslinkable aqueous polymer compositions may comprise an aqueous solvent, a crosslinkable polymer, and a crosslinking agent.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions of the present invention may further comprise a crosslinking agent for crosslinking the crosslinkable polymers to form the desired gelled substance. In some embodiments, the crosslinking agent may be a molecule or complex containing a reactive transition metal cation. Examples of suitable crosslinking agents include, but are not limited to, compounds or complexes containing chromic acetate and/or chromic chloride. Other suitable transition metal cations include, but are not limited to, chromium VI within a redox system, aluminum III, iron II, iron III, and zirconium IV. Borates may also be suitable.

The crosslinking agent should be present in the crosslinkable aqueous polymer compositions of the present invention in an amount sufficient to provide, inter alia, the desired degree of crosslinking. In some embodiments of the present invention, the crosslinking agent is present in the crosslinkable aqueous polymer compositions of the present invention in an amount in the range of from 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agents derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

In other embodiments, the gelled liquid compositions may comprise polymerizable organic monomer compositions. Generally, suitable polymerizable organic monomer compositions may comprise an aqueous-base fluid, a water-soluble polymerizable organic monomer, an oxygen scavenger, and a primary initiator.

The aqueous-base fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidepropyltriethylammonium chloride, N-vinyl pyrrolidone, vinyl-phosphonic acid, and methacryloyloxyethyl trimethylammonium sulfate, and any combination thereof. Preferably, the water-soluble polymerizable organic monomer should be self crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and any combination thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer(s) are included in the polymerizable organic monomer composition in an amount in the range of from about 1% to about 30% by weight of the aqueous-base fluid. In another embodiment of the present invention, the water-soluble polymerizable organic monomer(s) are included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used, inter alia, to initiate polymerization of the water-soluble polymerizable organic monomer(s) used in the present invention. Any compound or compounds which form free radicals in aqueous solution may be used as the primary initiator. The free radicals act, inter alia, to initiate polymerization of the water-soluble polymerizable organic monomer(s) present in the polymerizable organic monomer composition. Compounds suitable for use as the primary initiator include, but are not limited to, alkali metal persulfates, peroxides, oxidation-reduction systems employing reducing agents, (e.g., sulfites in combination with oxidizers, and azo polymerization initiators). Preferred azo polymerization initiators include 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s).

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Optionally, the polymerizable organic monomer compositions of the present invention further may comprise a crosslinking agent for crosslinking the polymerizable organic monomer compositions in the desired gelled substance. In some embodiments, the crosslinking agent is a molecule or complex containing a reactive transition metal cation. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from about 0.01% to about 5% by weight of the polymerizable organic monomer composition.

In some embodiments, the emulsified treatment fluids of the present invention may comprise furfuryl alcohol monomer consolidating agent that may polymerize in response to activation by an initiator compound or may self-polymerize at elevated temperatures.

In general, if the furfuryl alcohol monomer is introduced to a subterranean formation having a bottomhole temperature of about 250° F. or higher, no initiator compound is necessary to activate polymerization of the furfuryl alcohol monomer. In some embodiments, e.g., embodiments in which a subterranean formation has a bottomhole temperature less than about 250° F., the furfuryl alcohol monomer in the polymerizable treatment fluid may be contacted with an initiator compound in order to initiate polymerization.

Suitable initiator compounds for use in connection with the furfuryl alcohol monomers of the present invention may include organic acids, inorganic acids, acid anhydrides, or water soluble multivalent metal salts, mixtures thereof and the like. Some initiator compounds that may be used are acid initiator compounds. Examples of organic acids and acid anhydrides that may be suitable initiator compounds include maleic anhydride, phthalic anhydride, maleic acid, malic acid, phthalic acid, trichloroacetic acid, formic acid, oxalic acid, oxalic anhydride, pyromellitic dianhydride, dodecynyl succinic anhydride, hexahydrophthalic anhydride benzoic trichloride, hexachloroacetone, sodium trichloroacetate, sodium trifluoroacetate, and any combination thereof. A water soluble multivalent metal salt may comprise at least one of the following: a manganese ion, a zinc ion, a cadmium ion, a magnesium ion, a cobalt ion, a nickel ion, an iron ion, a lead ion, a calcium ion, a copper ion, and a tin ion. Suitable initiator compounds may also include delay acting initiator compounds. Examples of delay acting initiator compounds that may be suitable include block acids such as sulfonic acid, sulfamic acid, glycolic acid, and certain esters which are delay-acting catalysts, i.e., esters that slowly hydrolyze to release an acid that acts as an initiator compound. Examples of oil soluble initiators include dinonylnaphthalene disulfonic acid, alkylnaphthalene disulfonic acid, phosphoric acid, phthaloyl chloride, and phthalic anhydride.

An initiator compounded may be included in an emulsified treatment fluid or in an amount to contact an emulsified treatment fluid in an amount capable of activating polymerization of the furfuryl alcohol monomer under the prevailing conditions, e.g., subterranean temperature, and at the desired time. In some embodiments, this may be in an amount in a range of from about 0.1% to about 10% by weight of the treatment fluid. In some embodiments, the initiator compound may be present in an amount in the range of from about 1% to about 3% by weight of the treatment fluid. One of ordinary skill in the art with the benefit of this disclosure will be able to select an appropriate initiator compound and the appropriate amount to activate polymerization of the furfuryl alcohol monomer in the polymerizable treatment fluid.

In some embodiments, the emulsified treatment fluids of the present invention may further comprise a silane coupling agent, e.g., an organosilane coupling agent. The optional silane coupling agent may be used, among other things, to act as a mediator to help bond the polymerized furfuryl alcohol monomer to formation particulates. The term "organosilane coupling agent" as used herein refers to a compound having at least two reactive groups of different types bonded to a silicon atom. One of the reactive groups of different types is reactive with various inorganic materials such as glass, metals, silica sand and the like and may form a chemical bond with the surface of such inorganic materials; while the other reactive group is reactive with various kinds of organic materials and may form a chemical bond with the polymerizing or polymerized furfuryl alcohol monomer. As a result, some organosilane coupling agents are capable of providing enhanced chemical bonding between an organic material and an inorganic material.

While a organosilane coupling agent which is reactive with the polymerizing or polymerized furfuryl alcohol monomer may generally be suitable for use, examples of organosilane silane coupling agents that may be suitable include, N-2-(aminoethyl)-3-aminopropyltrimethoxysilane, 3-glycidoxypropyltrimethoxysilane, γ-aminopropyltriethoxysilane, N-beta-(aminoethyl)-γ-amino-propyltrimethoxysilanes, aminoethyl-N-beta-(aminoethyl)-γ-aminopropyl-trimethoxysilanes, γ-ureidopropyl-triethoxysilanes, beta-(3-epoxy-cyclohexyl)-ethyl-trimethoxysilane, γ-glycidoxypropyltri-methoxysilanes, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, γ-glycidoxypropyltrimethoxysilane, γ-glycidoxypropylmethylidiethoxysilane, N-beta (aminoethyl)-γ-aminopropyltrimethoxysilane, N-beta (aminoethyl)-γ-aminopropylmethyldimethoxysilane, 3-aminopropyltriethoxysilane, N-phenyl-γ-aminopropyltrimethoxysilane, γ-mercaptopropyltrimethoxysilane, vinyltris (beta-methoxyethoxy)silane, γ-metacryloxypropyltrimethoxysilane beta-(3,4 epoxycyclohexyl)-ethyltrimethoxysilane, γ-glycidoxypropyltrimethoxysilane γ-glycidoxypropyl-methyl-diethoxysilane, N-beta (aminoethyl)-raminopropylmethyldimethoxysilane, γ-aminopropyl-triethoxysilane, and any combination thereof.

A silane coupling agent may be included in an emulsified treatment fluid in an amount capable of sufficiently bonding the polymerized furfuryl alcohol monomer to the formation fines and/or sand. In some embodiments of the present invention, a silane coupling agent used is included in the treatment fluid in an amount in the range of about 0.1% to about 3% by weight of the treatment fluid, and preferably in the range of about 0.5% to about 2% by weight of the treatment fluid.

In other embodiments, the emulsified treatment fluids of the present invention may comprise a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. Where the particles include metal oxide particles (such as particles of silica, alumina, titania, magnesia, zirconia, other metal oxides or oxides including a mixture of these metal oxides (natural or synthetic)), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

In some embodiments, the consolidating agent may be a consolidating agent that is capable of altering an aggregation potential of a particulate metal oxide-containing solid by treating a particulate metal oxide-containing solid under conditions sufficient to acidify the surface of the particulate metal oxide-containing solid forming an acidified particulate metal oxide-containing solid having active surface hydroxyl groups (Sur-OH). After acidifying the particulate metal oxide-containing solid, the acidified particulate metal oxide-containing solid is treated with a surface modifying agent (A), which converts an effective portion of the Sur-OH groups of the acidified particulate metal oxide-containing solid into exchangeable surface salt (Sur-O—-AH+) groups to form a modified particulate metal oxide-containing solid having an effective number of Sur-O—-AH+ groups. After modifying the particulate metal oxide-containing solid, the modified particulate metal oxide-containing solid is treated with an exchange agent (Z—X), which converts an effective number of Sur-O—-AH+ groups into exchanged surface salt (Sur-O—-Z+) groups to form an exchange particulate metal oxide-containing solid having an effective number of Sur-O—-Z+ groups, where Z moieties alter an aggregation potential and/or zeta-potential of the particulate metal oxide-containing solid. If the A moiety alters an aggregations potential and/or zeta potential sufficiently to promote a desired degree of particle aggregation, then no other agents are needed. However, the method optionally and preferably includes a further step of exchanging the A moieties for a Z moiety derived from a phase transfer type agent. Thus, after forming the Sur-O—-AH+ groups, the modified particulate metal oxide-containing solid is treated with an exchange agent (Z—X), which converts an effective portion of the Sur-O—-A+ groups of the modified particulate metal oxide-containing solid into active surface exchanged salt (Sur-O—-Z+) groups to form an exchanged particulate metal oxide-containing solid having an aggregating effective amount of Sur-O—-Z+ groups, where Z moieties alter an aggregation potential and/or zeta-potential of the of the particulate metal oxide-containing solid.

Optionally, the emulsified treatment fluids of the present may comprise other components, such as salts, soaps, co-surfactants, acid generating compounds, carboxylic acids, acids, fluid loss control additives, gases, foamers, corrosion inhibitors, scale inhibitors, catalysts, clay control agents, biocides, friction reducers, antifoam agents, bridging agents, dispersants, flocculants, crosslinking agents, diverting agents (e.g., particulate diverting agents), proppant particulates, gravel particulates, $H_2S$ scavengers, $CO_2$ scavengers, oxygen scavengers, lubricants, viscosifiers, breakers, weighting agents, relative permeability modifiers, resins, particulate materials, wetting agents, coating enhancement agents, and any combination thereof.

In some embodiments, the emulsified treatment fluids of the present invention may be used as part of an oilfield operation selected from the group consisting of a drilling operation, a drill-in operation, a fracturing treatment, a well bore cleanup operation, a viscous sweep, a fines control treatment, an acidizing treatment, a stimulation treatment, a consolidation treatment, and any combination thereof.

In some embodiments, the methods of the present invention may be employed in conjunction with various pre-flush and post-flush treatments to support a reduction in particulate migration. These may be in primary or remedial treatment applications.

In some embodiments, the convertible surfactants useful in the present invention may also be used in surfactant gels. This may be advantageous because these surfactants should not harm the subterranean formation. These fluids can be used for fracturing, gravelpacking, frac packs, viscous sweeps, workover fluids, etc. If used as a viscosifying agent in these applications, the amount of convertible surfactant to include may range from about 0.1% to about 20% by weight of water, about 0.5% to about 20% by weight of water, or about 1% to about 7 by weight of water.

In some embodiments, the convertible surfactants useful in the present invention may be useful as biocides as well. If included in a subterranean treatment fluid, 0.05% to 2% by weight of the treatment fluid.

In some embodiments, another potential application of these convertible surfactants is their use in pipeline operations for pigging operations. These convertible surfactants may be used to clean the pipeline. They may also be used to help carry heavy oil through a pipeline. In some embodiments, the heavy oil can be emulsified and then transported easily through the pipeline, and then oil can be reclaimed on the other side by breaking the ester bond of surfactant by lowering the pH emulsion or by heating the emulsion.

To facilitate a better understanding of the present invention, the following examples of certain aspects of some embodiments are given. In no way should the following examples be read to limit, or define, the scope of the invention.

EXAMPLES

Synthesis of Convertible Surfactants

The hydrolyzable ester group between the hydrophobic tail and the quaternary ammonium hydrophilic head group is introduced by first reacting n-alkyl alcohol with chloroacetyl chloride followed by the reaction of the alkylester chloride formed, with tertiary amine. As shown in Scheme 1, the n-alkyl alcohol 1 a-c ((a) $R=C_{12}H_{25}—$; (b) $R=C_{16}H_{33}—$; (c) $R=C_{18}H_{37}—$) is reacted with chloroacetyl chloride to afford alkylester chloride 2a-c ((a) $R=C_{12}H_{25}—$; (b) $R=C_{16}H_{33}—$; (c) $R=C_{18}H_{37}—$), which is further reacted at room temperature, in acetone with N,N-dimethylbenzylamine 3 for 72 hours to afford the quaternary ammonium surfactant 4a-c in quantitative yield. See Scheme 1 for an illustration of the synthesis of the surfactant.

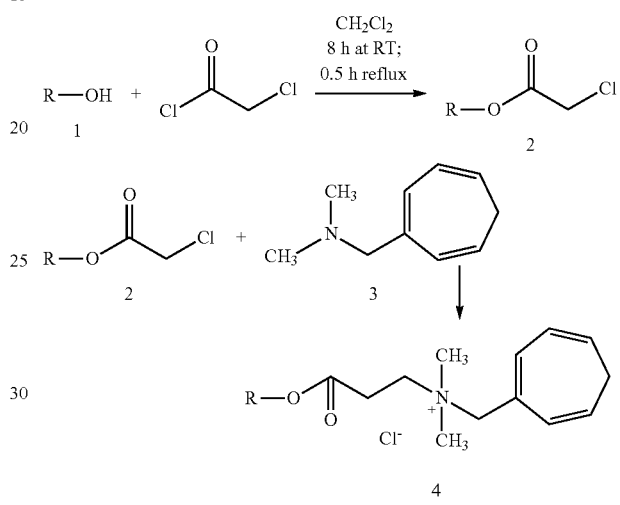

a. $R = CH_3—(CH_2)_{11}$
b. $R = CH_3—(CH_2)_{15}$
c. $R = CH_3—(CH_2)_{17}$

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing an emulsified treatment fluid comprising an oleaginous phase, an aqueous phase, a consolidating agent in the discontinuous phase of the emulsified fluid, and an emulsifying agent that comprises at least one convertible surfactant described by a formula selected from the group consisting of:

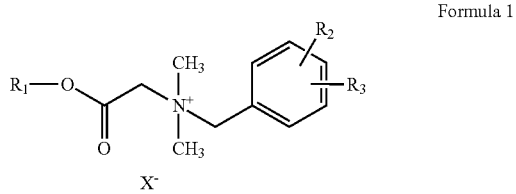

Formula 1 wherein $R_1$, $R_2$ and $R_3$ are independently H, alkyl, aryl, polyether, or oxyalkylate group and X may be a halogen counterion, a sulfate ion, a tosylate ion, a mesylate ion, or the like;

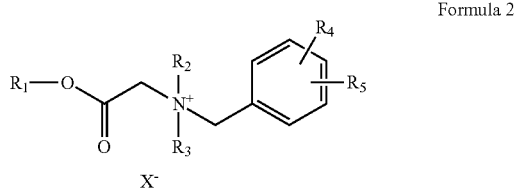

Formula 2 wherein $R_1$ is an alkyl group that is linear or nonlinear comprising 6-22 carbon atoms, aryl group, and alkyl aryl group; $R_2$ and $R_3$ are independently selectable from an alkyl group of 1-6 carbon chains, $R_4$ and $R_5$ are independently H, alkyl, aryl, polyether, or alkyloxyalkylate group and X may be a halogen counterion, a sulfate ion, a tosylate ion, a mesylate ion, or the like; and

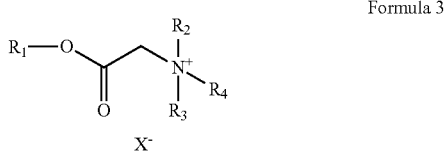

Formula 3 wherein $R_1$, $R_2$, $R_3$, and $R_4$ are not hydrogen, and wherein $R_1$, $R_2$, $R_3$, and $R_4$ are carbons atoms linked to any other suitable group and X may be a halogen counterion, a sulfate ion, a tosylate ion, a mesylate ion, or the like; and placing the emulsified treatment fluid in a subterranean formation, converting the convertible surfactant to an amphoteric or zwitterionic surfactant thereby breaking the emulsion and releasing the consolidation agent to treat the subterranean formation.

2. The method of claim 1 wherein the aqueous phase comprises an aqueous fluid selected from the group consisting of: freshwater, seawater, saltwater, a brine, and any combination thereof.

3. The method of claim 1 wherein the oleaginous fluid comprises an oleaginous fluid selected from the group consisting of: an α-olefin, an internal olefin, an alkane, an aromatic solvent, a cycloalkane, a liquefied petroleum gas, kerosene, a diesel oil, a crude oil, a gas oil, a fuel oil, a paraffin oil, a mineral oil, a low toxicity mineral oil, an olefin, an ester, an amide, a synthetic oil, a polyolefin, a polydiorganosiloxane, a siloxane, an organosiloxane, an ether, an acetal, a dialkylcarbonate, a hydrocarbon, a petroleum distillates, a crude oil mixture, and any combinations thereof.

4. The method of claim 1 wherein the consolidating agent comprises a consolidating agent selected from the group consisting of: a resin, a tackifying agent, a gelable liquid composition, and any combination thereof.

5. The method of claim 1 wherein the consolidating agent comprises a resin selected from the group consisting of a two component epoxy based resin, a novolak resin, a polyepoxide resin, a phenol-aldehyde resin, a urea-aldehyde resin, a urethane resins, a phenolic resin, a furan resin, a furan/furfuryl alcohol resin, a phenolic/latex resin, a phenol formaldehyde resin, a polyester resin, a polyester resin hybrid, a polyester resin copolymer, a polyurethane resin, a polyurethane hybrid, a polyurethane copolymer, an acrylate resin, and any combination thereof.

6. The method of claim 1 wherein the consolidating agent comprises a tackifying agent selected from the group consisting of: a non-aqueous tackifying agent, an aqueous tackifying agents, a silyl-modified polyamide, and any combination thereof.

7. The method of claim 1 further comprising a solvent and/or a silyl-modified polyamide compound.

8. The method of claim 1 wherein the emulsified treatment fluid comprises a gelable liquid composition.

9. The method of claim 1 wherein the consolidating agent comprises a furfuryl alcohol monomer consolidating agent and an initiator.

10. The method of claim 1 wherein the consolidating agent comprises a silane coupling agent.

11. The method of claim 1 wherein the consolidating agent comprises an amine and a phosphate ester.

12. The method of claim 1 wherein the consolidating agent that is capable of altering an aggregation potential of a particulate metal oxide-containing solid.

13. The method of claim 1 wherein the emulsified treatment fluid comprises a component selected from the group consisting of: a salt, a soap, a co-surfactant, an acid generating compound, a carboxylic acid, an acid, a fluid loss control additive, a gas, a foamer, a corrosion inhibitor, a scale inhibitor, a catalyst, a clay control agent, a biocide, a friction reducer, an antifoam agent, a bridging agent, a dispersant, a flocculant, a crosslinking agent, a diverting agent, a proppant particulate, a gravel particulate, an $H_2S$ scavenger, a $CO_2$ scavenger, an oxygen scavenger, a lubricant, a viscosifier, a breaker, a weighting agent, a relative permeability modifier, a wetting agent, a coating enhancement agent, and any combination thereof.

14. The method of claim 1 wherein the emulsified treatment fluid is placed in the subterranean formation for a fines control treatment or consolidation treatment.

15. A method comprising:
providing an emulsified treatment fluid comprising an oleaginous phase, an aqueous phase, a consolidating agent in the discontinuous phase of the emulsified fluid, and an emulsifying agent that comprises at least one convertible surfactant described by a formula selected from the group consisting of:

Formula 1

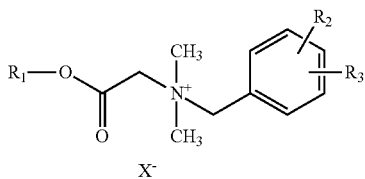

wherein $R_1$, $R_2$ and $R_3$ are independently H, alkyl, aryl, polyether, or oxyalkylate group and X may be any halogen counterion, a sulfate ion, a tosylate ion, a mesylate ion, or the like;

Formula 2

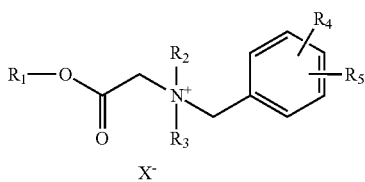

wherein $R_1$ is an alkyl group that is linear or nonlinear comprising 6-22 carbon atoms, aryl group, and alkyl aryl group; $R_2$ and $R_3$ are independently selectable from an alkyl group of 1-6 carbon chains, $R_4$ and $R_5$ are independently H, alkyl, aryl, polyether, or alkyloxyalkylate group and X may be a halogen counterion, a sulfate ion, a tosylate ion, a mesylate ion, or the like; and Formula 3

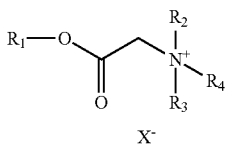

wherein $R_1$, $R_2$, $R_3$, and $R_4$ are not hydrogen, and wherein $R_1$, $R_2$, $R_3$, and $R_4$ are carbons atoms linked to any other suitable group and X may be a halogen counterion, a sulfate ion, a tosylate ion, a mesylate ion, or the like;

placing the emulsified treatment fluid in a subterranean formation; and allowing the consolidating agent to consolidate particulates in the subterranean formation, converting the convertible surfactant to an amphoteric or zwitterionic surfactant thereby breaking the emulsion and releasing the consolidation agent to consolidate particulates in the subterranean formation.

16. The method of claim 15 wherein the consolidating agent comprises a resin selected from the group consisting of: a two component epoxy based resin, a novolak resin, a polyepoxide resin, a phenol-aldehyde resin, a urea-aldehyde resin, a urethane resins, a phenolic resin, a furan resin, a furan/furfuryl alcohol resin, a phenolic/latex resin, a phenol formaldehyde resin, a polyester resin, a polyester resin hybrid, a polyester resin copolymer, a polyurethane resin, a polyurethane hybrid, a polyurethane copolymer, an acrylate resin, and any combination thereof.

17. The method of claim 15 wherein the consolidating agent comprises a tackifying agent selected from the group consisting of: a non-aqueous tackifying agent, an aqueous tackifying agents, a silyl-modified polyamide, and any combination thereof.

18. The method of claim 15 further comprising a solvent and/or a silyl-modified polyamide compound.

19. The method of claim 15 wherein the emulsified treatment fluid comprises a gelable liquid composition.

20. The method of claim 15 wherein the consolidating agent comprises a furfuryl alcohol monomer consolidating agent and an initiator.

21. The method of claim 15 wherein the consolidating agent comprises a silane coupling agent.

22. The method of claim 1 wherein the consolidating agent comprises an amine and a phosphate ester.

23. The method of claim 1 wherein the consolidating agent that is capable of altering an aggregation potential of a particulate metal oxide-containing solid.

* * * * *